Aug. 29, 1961   W. R. HAWTHORNE ET AL   2,997,973
VESSELS FOR TRANSPORTING OR STORING LIQUIDS
OR FLUIDISABLE SOLIDS
Filed Jan. 6, 1958   6 Sheets-Sheet 1
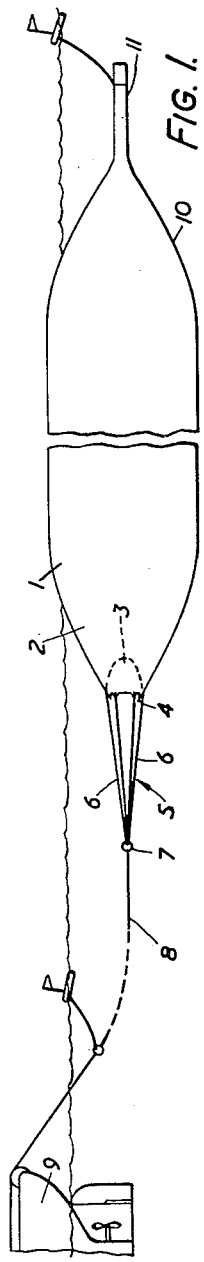
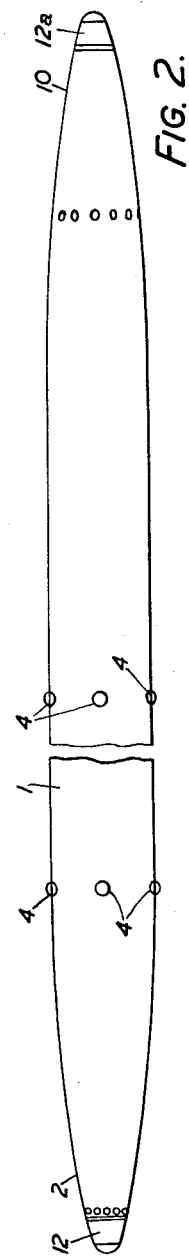
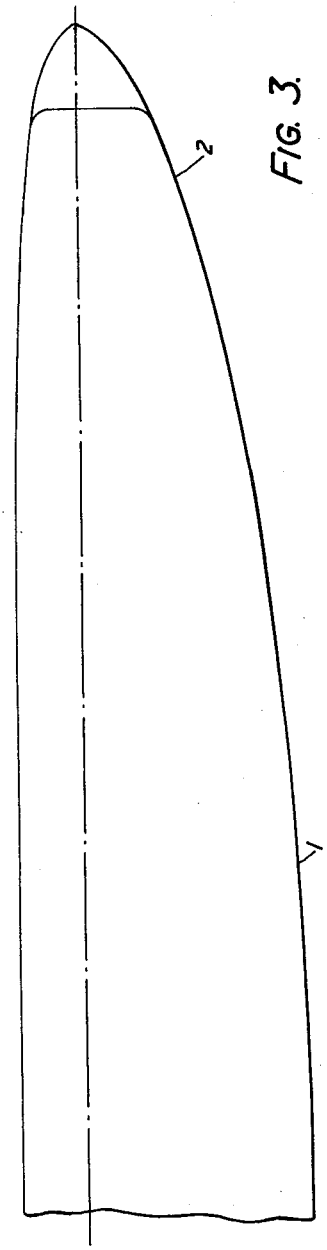
INVENTORS
William Rede Hawthorne
John Christopher Shuldham Shaw
BY Stevens, Davis, Miller & Mosher
their ATTORNEY

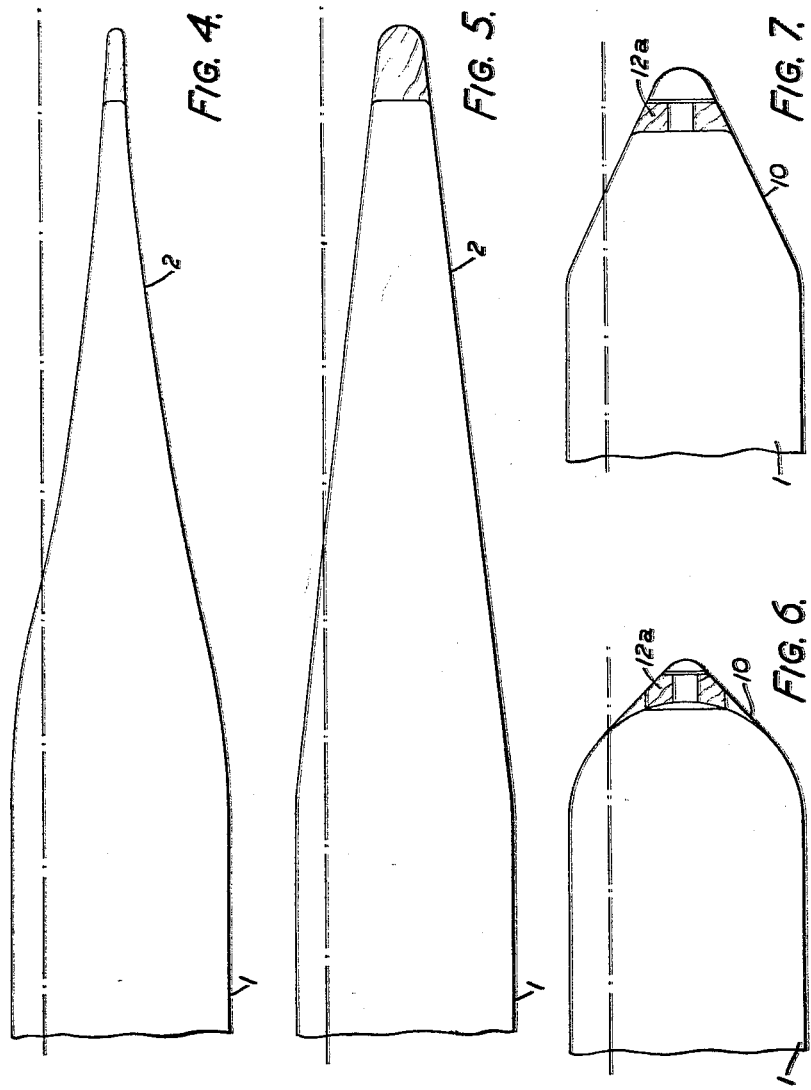

Aug. 29, 1961 W. R. HAWTHORNE ET AL 2,997,973
VESSELS FOR TRANSPORTING OR STORING LIQUIDS
OR FLUIDISABLE SOLIDS
Filed Jan. 6, 1958 6 Sheets-Sheet 3

INVENTORS
William Rede Hawthorne,
John Christofer Shuldham Shaw
BY
Stevens, Davis, Miller & Mosher
their ATTORNEYS

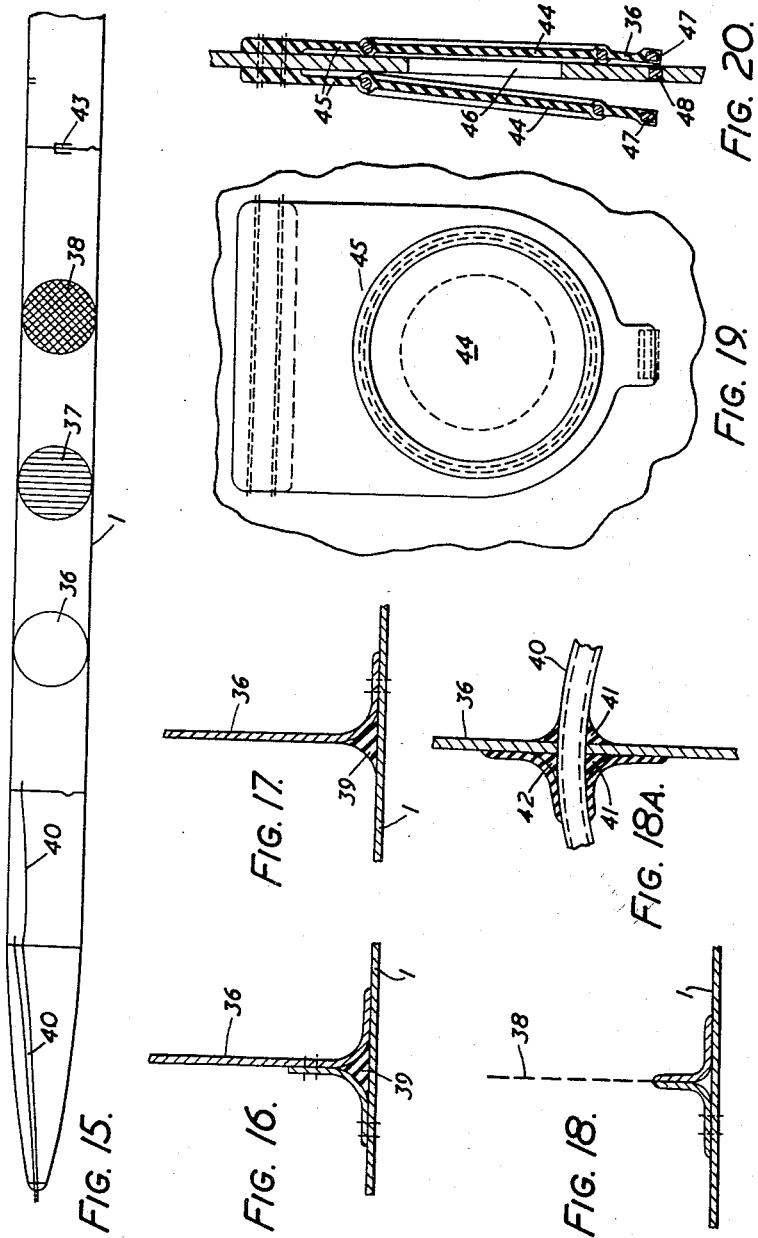

United States Patent Office 2,997,973
Patented Aug. 29, 1961

2,997,973
VESSELS FOR TRANSPORTING OR STORING LIQUIDS OR FLUIDISABLE SOLIDS
William Rede Hawthorne and John Christopher Shuldham Shaw, Cambridge, England, assignors to Dracone Developments Limited, London, England
Filed Jan. 6, 1958, Ser. No. 707,347
Claims priority, application Great Britain Jan. 9, 1957
2 Claims. (Cl. 114—74)

This invention relates to vessels for transporting or storing liquids or fluidisable solids which have a specific gravity less than that of sea water. By "fluidisable solids" is meant granular or like solids which can be caused to flow under the action of a fluid such as compressed air or water. Barges are at present made of metal, wood, or other material which is still and rigid, and usually have large openings above the water line. This is unnecessary if the barge is only to contain liquids.

According to the present invention, the vessel comprises a closed tube of flexible material, such as a natural or synthetic rubber impregnated fabric, which has a streamlined nose adapted to be connected to towing means, and one or more pipes communicating with the interior of the vessel and such as to permit filling and emptying of the vessel. The length of the vessel is greater than twenty times its beam, so that the material is used most effectively from the point of view of strength requirements and the vessel can be more easily stored by winding or folding. The buoyancy is supplied by the liquid contents of the vessel and its shape depends on the degree to which it is filled.

The filling and emptying pipes may be flexible and may be blended into the fabric of the vessel. Preferably there is only one such pipe, which is constructed as the termination of the tail. The vessel is preferably made as a simple tube with a nose and a tail, but it may be reinforced by divisions which are porous, or divided by bulkheads which are impervious to the liquid contents.

The vessel may be towed by means of a rope, which is attached to the fabric of the nose section by means of a bridle consisting of many ropes. The nose shape and attachment of the tow rope at the nose is designed to distribute the towing load uniformly and to enable the fabric to adopt a natural position with the minimum of stress concentration or folding and flapping. The bridle may be joined to the fabric either by weaving or glueing the actual strand of the rope into the fabric itself or may pass through blocks attached to the tow rope and through eyelets let into the material of the fabric which is shaped so as to receive the eyelets. Alternatively loops of rope may be arranged to compensate between the parts nearer to or further from the towing point. The points of attachment of the bridle are preferably at a considerably smaller radius than the full tube radius and the nose is strengthened to withstand the towing strains and the strain due to the dynamic suction downstream of the bridle attachment points. These and other similar methods of attaching the bridle ropes to the fabric will be evident to those skilled in the art. Preferably, however, a single towing rope is made integral with the nose of the vessel itself, the individual strands of the towing rope being woven into the fabric of the nose.

The fabric from which the vessel is made may be made up into the tube with shaped ends by sewing or by using the proofing material as a glue. Suitable proofing materials are butadiene elastomer, fluosilicates and cold setting resins. Preferably the tube and the shaped ends are constructed by weaving in one piece as a continuous tube, and the completed fabric skin may then be proofed, or used as a strong cover for an inner skin of nylon sheet or other material impervious to the liquid carried within the barge. The fabric of the cover is preferably nylon or some other inorganic material to prevent the formation of marine growths and to allow expansion under pressure, preferably in the order of 10% to 20%.

The vessel may be fitted with a device or devices for releasing any gas or vapour that is given off by the cargo, but whilst this may be desirable it is not an essential part of the construction of the barge.

From the foregoing, it will be seen that the invention comprises a collapsible, all fabric tanker.

The invention also comprises a collapsible storage tank consisting of fabric, the basic idea of which is to store liquids lighter than water by floating the fabric shape containing fluid in water.

In the case of a tubular tanker, the ratio of tube length to diameter is large (20 to 1 for example) for economy in thickness of material because tension due to hydrostatic pressures is proportional to the square of the diameter and is not a function of the length. The stress due to towing or drag is a function of the length but this is small compared to the tension due to hydrostatic pressure. Hence to achieve large capacity for a given amount of material and for ease of storage and winding, the tube is several diameters long.

Other shapes of tanker may be constructed by joining adjacent tubes, either longitudinally or in the shape of a vertical or horizontal honeycomb, compartmenting inside an outer skin, reinforcing outer skins by internal bracing walls of fabric, making outer shapes of suitable form to minimise drag, tension and distortion of the fabric envelope.

The tension due to hydrostatic pressure is a function of the ratio of the densities of the inner and outer fluids and is also strongly dependent on the fraction of the volume filled by fluid, i.e. of the ratio of the actual volume filled to the maximum volume which could be enclosed by the fabric (the effect of tension on the surface area of the fabric shape is neglected in the comparison). Since, for a simple tube, the hoop tension doubles when the percentage filled increases from 86% to 96% (for a density ratio of 0.85) it is desirable, especially in storage tanks, to design for large size but small fraction filled, i.e. for a given strength the optimum use of material may be obtained by designing for a fraction filled appreciably less than unity (e.g. for 0.8). Similar considerations apply to non-tubular shapes.

Owing to the increase of tension with the fraction filled even an inelastic fabric shape will have a pseudo-elastic behaviour. In a tube of fluid floating on a water a disturbance caused by temporary displacement of fluid from one section to another, for example by pinching the tube, will cause an increase of tension in the more filled portions of the tube and a decrease in the less filled portions. These changes in tension act in an elastic fashion to restore the static equilibrium and an oscillation may therefore occur. In a tube of given length and diameter the frequency of such natural, sloshing oscillations will depend on the fraction filled. If such a natural frequency coincides with the frequencies due to wave motion in the sea, resonance may occur. The hoop tension is not a simple function of the fraction filled and there is a large amount of non-linearity in the system which may limit the amplitude of oscillation. The fraction filled may be chosen to diminish the likelihood of resonance with waves of large amplitude. Viscous damping may be introduced to diminish the tension in the fabric due to sloshing. For instance, fabric diaphragms with holes or perforations may be placed at intervals along the tube. A vibration absorber may be used instead with or without viscous damping; such a device might comprise an inner tube of fabric so filled as to resonate at the forcing frequency of the waves. The amplitude of vibrations in the vibration absorber would themselves be damped by perforated screens, baffles, etc. Alternatively the shape may be compartmented by more or less impermeable fabric partitions to reduce sloshing.

Gas is given off by crude oil at a rate which depends on its storage pressure, temperature and probably its degree of agitation. Several means of dealing with the accumulation of gas during towing include:

(a) Its retention in the vessel which is designed to withstand the maximum likely vapour pressure.

(b) Blisters or pockets might be fitted at points along the length of the tube so that gas could be collected in them. The accompanying drawing shows a typical design. A perforated, netted portion of the main tube would be surrounded by a fabric blister. Gas would tend to collect at the top of the blister.

(c) To prevent excessive temperatures developing at the exposed top of the tube or shape when towing or storing in sunny periods, the shape may be designed to rotate or oscillate about its longitudinal axis.

Examples of towed barges according to the invention are illustrated in the accompanying drawings, in which:

FIG. 1 is a diagrammatic side elevation of a flexible vessel according to the invention;

FIG. 2 is a side elevation of a modified shape of vessel;

FIGS. 3, 4, 5, 6 and 7 show modified end shapes of the vessel;

FIG. 15 is a diagrammatic view showing various forms of partitions of the barge and FIGS. 16, 17, 18 and 18a are fragmentary views of the vessel in FIG. 15, as will hereinafter appear;

FIGS. 19 and 20 are front and side sectional elevations respectively of a gravity valve as will hereinafter appear;

Figure 9:
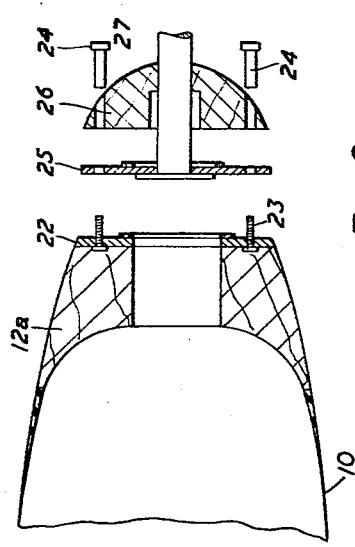
FIGS. 8 and 9 show respectively side sectional elevations of the bow and stern structures.

Referring to FIG. 1, the barge consists of a tube 1 thirty feet in diameter, and six hundred feet long, whose front is shaped and strengthened into a streamlined nose 2 by using extra layers of fabric if necessary. This nose 2, inside which a diaphragm 3 projects into the vessel to act as a device for pressurizing the cargo, as more fully described in copending application Serial No. 729,900, now abandoned, is fitted with ten towing eyelets 4. The tow is taken by a bridle 5 consisting of ten ropes 6 each twenty feet long shackled to a ring 7. This is in turn shackled to the towing rope 8 which is passed through a fairlead on the stern of the towing vessel or tug 9. The tail of the barge is in the form of a streamlined cone 10 terminated by a pipe 11 at the end of which is a suitable coupling for joining to a filling and emptying pipe.

A modified shape of barge is illustrated in FIG. 2. The ends of the barge are ellipsoidal, the ellipsoid being either symmetrical, as shown in FIG. 2 or asymmetrical, as illustrated in FIG. 3. Further symmetrical forms are illustrated in FIGS. 4 and 5, of which FIG. 4 shows a slender tapered shape, primarily intended for use at the bow, and in which the contours are in the form of re-entrant arcs. FIG. 5 shows a purely conical form and is also intended primarily as a bow form.

FIGS. 6 and 7 show suitable forms of stern shape, FIG. 6 being part-spherical and FIG. 7 conical. It will be understood that in all these shapes, either the bow or the stern, or both, will be provided with rigid end members as indicated generally at 12, 12a in FIG. 2 and described more fully hereinafter with reference to FIGS. 8 and 9, and also with a pipe communicating with the interior for the purpose of filling or emptying the vessel, but this pipe has not been illustrated in the drawings.

Figure 8:
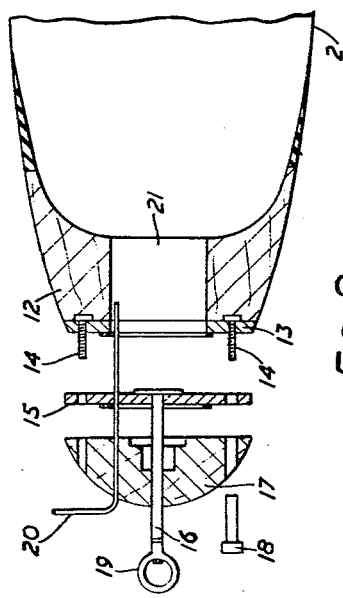

The internal structure of the bow is shown more clearly in FIG. 8 and, as shown, consists of a rigid contour member 12 of wood or other suitable material to which is secured, for example by screws, a metal plate 13 bearing studs 14 for the attachment of an anchor plate 15 for carrying a tow bar 16. These studs also serve to secure the nose portion 17, the whole assembly being held together by ends 18. The tow bar 16 is provided at its forward end with a swivel towing ring 19. A filling pipe 20 passes through the nose portion 17 and communicates with the interior of the barge through a channel 21 in the profiled member 12.

The construction of the stern of the vessel is illustrated in FIG. 9 and consists of a profiled member 12a similar to member 12 at the bow and carrying in a similar manner a plate 22 secured by studs 23 and nuts 24, an anchoring plate 25 being secured between the member 21 and the end member 26 and having secured thereto a filling pipe 27.

Figure 10:
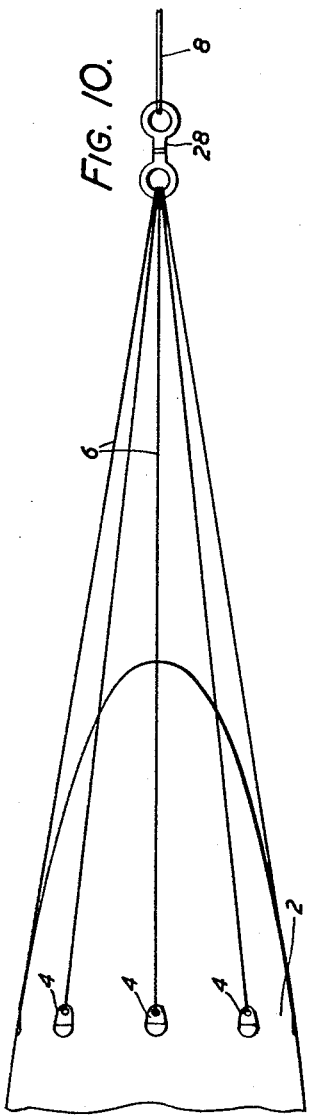
FIG. 10 is a diagrammatic illustration of a bridle attachment.

FIG. 10 shows how the bridle consisting of the ropes 6 is secured to the nose 2 of the vessel by means of eyelets 4. The towing rope 8 is shown attached to one eyepiece of a swivel coupling member 28.

Figure 11:
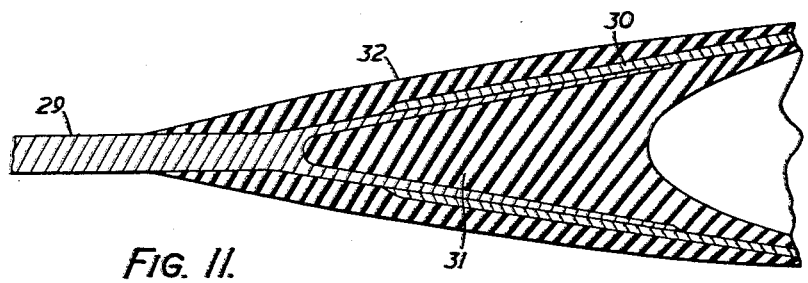
FIG. 11 is a side sectional elevation of one form of tow rope made integral with the bow of the vessel.

FIG. 11 shows a construction utilizing an integral tow rope 29 constructed of wire rope or cordage, which is spliced or sewn to a core 30 of nylon or other strong material (being a continuation of the material of the main tube body portion 1), the joint being protected both inside and out by a mass of material such as rubber, as indicated at 31 and 32. This, and the FIG. 12 construction, may be used instead of the rigid bow portion 12 of FIGS. 2–7.

Figure 12:
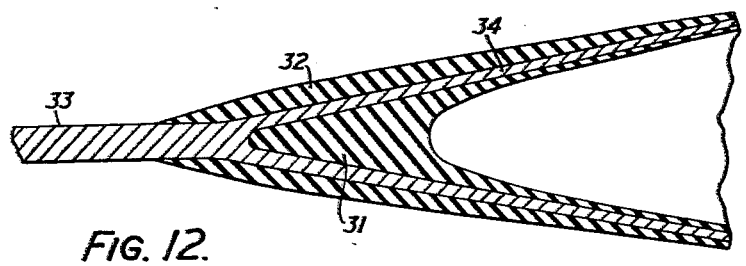
FIG. 12 is a view similar to FIG. 11 of a modified form of construction.

FIG. 12 illustrates a further construction of integral tow rope 33 formed by weaving or rolling or twisting the material of a nylon or other core 34 (being an extension of the main tube body 1), the arrangement being protected by material 31 and 32 as in the construction illustrated in FIG. 11.

Figure 13:
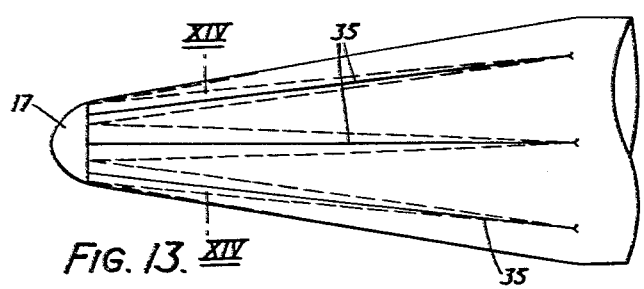
FIG. 13 is a side elevation of one end of a vessel according to the invention showing the shaping of the end by pleating the material.
Figure 14:
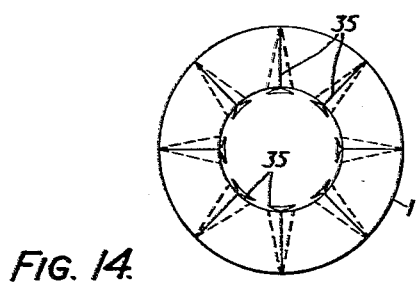
FIG. 14 is a sectional view on the line XIV—XIV of FIG. 13.

FIGS. 13 and 14 show how the fabric is pleated at its ends as indicated at 35 and glued and/or sewn to provide the desired shape of stern or bow. The nose portion or fairing 17 may be constructed as shown in FIG. 8 but the tow bar is not illustrated.

FIG. 15 illustrates how the vessel may be divided into separate compartments by means of bulkheads which may be impervious as indicated at 36, or perforated as indicated at 37, or in the form of a net as indicated at 38. The bulkheads or partitions 36, 37 or 38 may be secured to the walls of the vessel by glueing and/or stitching as shown in FIGS. 16, 17 or 18, a fillet of oil-resistant rubber being provided as indicated at 39. Each compartment is provided with a separate flexible filling pipe and/or gas-removal pipe as indicated at 40 in FIG. 15, and these pass through the partitions, where necessary, and are sealed thereto by oil-resistant rubber 41, as illustrated in FIG. 18A. The joints may be strengthened by a coupling of rubberised material 42. If desired, communication between one compartment and the next may be provided by gravity-operated valves 43 (FIG. 15). These valves are illustrated in greater detail in FIGS. 19 and 20 and consist of flaps 44 of rubberised flexible material strengthened with metal which hang vertically from flexible, e.g. rubber, hinges 45 so as to close the port 46 in the partition 36. The hinges 45 may conveniently be glued or sewn to the partition 36 and the lower ends of the flaps 44 may be provided with magnets 47 which cooperate with a magnet 48 to hold the flaps closed when the vessel is in its normal position with the flaps hanging closed. By turning the vessel about its fore and aft axis to bring the magnets uppermost, the magnetism is no longer sufficient to hold the valves closed and the flaps therefore open under gravity. The flaps may be stiffened by means of metal rings 49. Alternatively the magnets 47 may be simple weights for holding the flaps closed by gravity.

Figure 21:
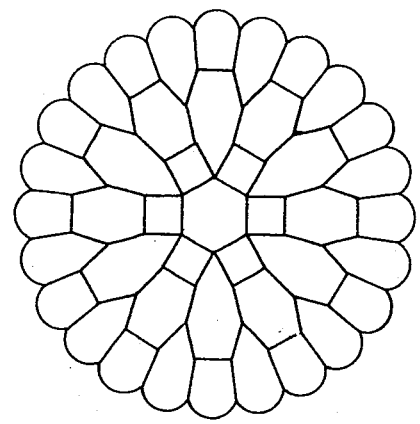
FIG. 21 is a cross-section through a modified construction of vessel according to the invention.

A cross-section of a barge having longitudinal partitions, somewhat in the form of a honeycomb, is illustrated in FIG. 21. The partitions form longitudinally extending cells.

Figure 22:
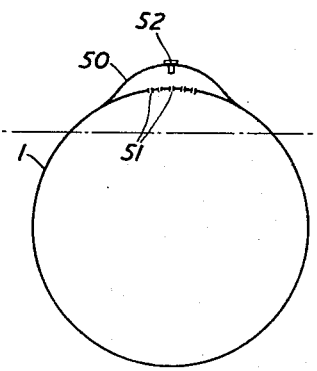
FIG. 22 is a diagrammatic cross-section of a further modified form of vessel according to the invention showing means for venting gases.
Figure 23:
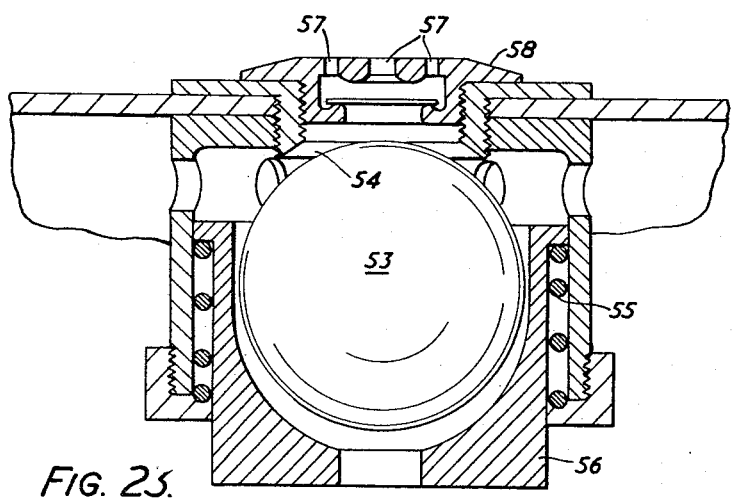
FIG. 23 is a side sectional elevation on an enlarged scale of part of FIG. 22.

FIG. 22 shows how a blister 50 in the top of the vessel 1 may communicate therewith through vents 51 and may be provided with gas-escape valves 52 so as to permit the escape of gases from the vessel. A suitable form of gas-escape valve is illustrated in FIG. 23 and consists of a float 53 closing a seating orifice 54 either under the action of the liquid acting on the float or under the action of a coil spring 55 acting on a sliding housing 56 in the ball float. Provided the valve is at the top of the vessel, in the event of gases accumulating in the top of the blister 50, the ball float 53 can be moved away from the seating 54 and allow venting of gases through the orifice 57 in a cover plate 58.

What we claim is:

1. A flexible barge for transporting fluid and pourable solid cargo of a specific gravity less than sea water, comprising an elongated collapsible closed envelope of flexible material, said envelope being capable of being wound up and folded when collapsed and having a length to beam ratio of not less than 20.

2. The barge of claim 1, including venting means on said envelope effective to permit the escape of gases and vapours given off by said cargo.

References Cited in the file of this patent

UNITED STATES PATENTS

| | | |
|---|---|---|
| 389,615 | Townsend | Sept. 18, 1888 |
| 546,485 | Ericson et al. | Sept. 17, 1895 |
| 2,371,404 | Mumford | Mar. 13, 1945 |
| 2,391,926 | Scott | Jan. 1, 1946 |
| 2,492,699 | Houwink | Dec. 27, 1949 |

FOREIGN PATENTS

| | | |
|---|---|---|
| 4,079 | Great Britain | of 1890 |